(12) United States Patent
Laverdiere et al.

(10) Patent No.: US 9,425,596 B2
(45) Date of Patent: Aug. 23, 2016

(54) WIRE CONNECTOR

(71) Applicant: Thomas & Betts, International LLC, Wilmington, DE (US)

(72) Inventors: Alain Laverdiere, Pointe-Claire (CA); Yves Boucher, St-Jean-sur-Richelieu (CA)

(73) Assignee: Thomas & Betts International Inc., Wilmington, DE (US)

( * ) Notice: Subject to any disclaimer, the term of this patent is extended or adjusted under 35 U.S.C. 154(b) by 16 days.

(21) Appl. No.: 14/502,819

(22) Filed: Sep. 30, 2014

(65) Prior Publication Data

US 2015/0090488 A1   Apr. 2, 2015

Related U.S. Application Data

(60) Provisional application No. 61/884,684, filed on Sep. 30, 2013.

(51) Int. Cl.
*H01B 17/26*   (2006.01)
*H02G 3/08*   (2006.01)

(52) U.S. Cl.
CPC ..................... *H02G 3/083* (2013.01)

(58) Field of Classification Search
USPC .......................................... 174/660
See application file for complete search history.

(56) References Cited

U.S. PATENT DOCUMENTS

| | | | |
|---|---|---|---|
| 2,458,408 A * | 1/1949 | Owens ..................... | C08G 8/04 528/137 |
| 2,564,341 A * | 8/1951 | Paige ..................... | H02G 3/065 285/154.1 |
| 3,437,980 A | 4/1969 | Smith | |
| 3,989,340 A | 11/1976 | Sheldon | |
| 4,208,085 A | 6/1980 | Lawrence | |
| 4,299,363 A * | 11/1981 | Datschefski ........... | H02G 3/083 16/108 |
| 4,389,535 A | 6/1983 | Slater | |
| 4,402,565 A | 9/1983 | Poliak | |
| 4,424,406 A | 1/1984 | Slater | |
| 4,556,273 A | 12/1985 | Pudims | |
| 4,605,816 A | 8/1986 | Jorgensen | |
| 4,919,370 A | 4/1990 | Martin | |
| 4,970,350 A * | 11/1990 | Harrington ............ | H02G 3/065 174/153 G |

(Continued)

OTHER PUBLICATIONS

Thomas & Betts, Nonmetallic connector ½ in (CI4004), Web Catalogue, copyright 2006, Thomas & Betts Limited, Canada.

(Continued)

*Primary Examiner* — Michael F McAllister
(74) *Attorney, Agent, or Firm* — Butler Snow LLP

(57) ABSTRACT

An improved wire connector is provided that allows for securing one, two, or more cables in an electrical box knockout hole. The wire connector body interior includes a central tab with a hinge for exerting pressure against at least a first/tab cable. The central tab also has a gripping portion for gripping the tab cable without cutting its sheathing. In preferred embodiments, the central tab further includes a multifunction tab member, such as a multifunction knob or multifunction bumpers, which provides inter alia a secondary spring function for applying added pressure on an inserted tab cable, especially when a second/wall cable is inserted. The wire connector body contains ribs on the inner wall facing the central tab gripping portion for gripping a wall cable without cutting its insulation. The wire connector body also contains a longitudinal slot for easy installation or removal from an electrical box.

28 Claims, 10 Drawing Sheets

(56) References Cited

U.S. PATENT DOCUMENTS

| | | | |
|---|---|---|---|
| 5,083,938 A | 1/1992 | Poliak | |
| 5,118,057 A * | 6/1992 | Martin | H03G 3/065 |
| | | | 174/153 G |
| 5,374,017 A | 12/1994 | Martin | |
| 5,594,209 A * | 1/1997 | Nattel | H01R 13/46 |
| | | | 174/153 G |
| 5,693,910 A | 12/1997 | Gretz | |
| 5,743,759 A | 4/1998 | Pudims | |
| 6,143,982 A | 11/2000 | Gretz | |
| 6,310,290 B1 * | 10/2001 | Gretz | H02G 3/065 |
| | | | 174/135 |
| 6,765,148 B2 | 7/2004 | Rix | |
| 7,211,744 B2 | 5/2007 | Jorgensen | |
| 7,615,714 B2 | 11/2009 | Pyron | |
| 7,874,865 B2 | 1/2011 | Tobey | |
| 8,487,196 B1 | 7/2013 | Baldwin | |

OTHER PUBLICATIONS

Thomas & Betts Canada, Non metallic connector—Trade size of ½ in. (W100LX-D), copyright 2006, Thomas & Betts Limited, Canada.

Thomas & Betts, Nonmetallic Sheathed Cable Fittings, Connectors and Accessories, published on or before Sep. 3, 2013, Thomas & Betts, Canada.

Rack-A-Tiers, Rapid Fire Connectors ½", (RAT500),published on or before Sep. 3, 2013.

Rack-A-Tiers, Tom 2-Way Connectors ½",(TT500), published on or before Sep. 3, 2013.

Rack-A-Tiers, Rapid Fire Connectors ¾", (RAT750), published on or before Sep. 3, 2013.

ETD Corp, RC50 & RC75 Non-Metallic Connectors, published on or before Sep. 3, 2013.

* cited by examiner

WIRE CONNECTOR

CROSS-REFERENCES TO RELATED APPLICATIONS

This application claims the benefit of U.S. Provisional Application No. 61/884,684, filed Sep. 30, 2013, which is incorporated herein by reference in its entirety.

FIELD OF THE INVENTION

The present invention is generally directed toward a wire connector. More particularly, an improved wire connector for securing more than one cable in an electrical box knockout hole.

BACKGROUND OF THE INVENTION

Electrical boxes contain cable entry ports (commonly referred to as "knockout holes") for inserting electrical, data, and/or other cable(s). Cables inserted into an electrical box must be secured to maintain the cable(s) in place and to prevent them from being inadvertently pulled out. Wire connectors for securing one or two cables inserted into an electrical box knockout hole are known in the art. Known wire connectors have been made in various materials including sheet metal and plastic.

SUMMARY OF THE INVENTION

The present invention eliminates the above-described disadvantages and weaknesses by providing an improved wire connector for securing one or two cables in an electrical box knockout hole. In one aspect of the present invention, the wire connector comprises a body having an exterior wall, an interior wall, a proximal edge, a distal edge, and a longitudinal slot. The exterior wall comprises exterior sloped wall members extending outward from the exterior wall simulating an oval shape. The exterior wall also has an annular exterior stop member extending outward from the exterior wall. To apply pressure on the one, two, or more cables inserted into the wire connector, the interior wall has a central tab connected to the interior wall by a hinge portion. To better grip the one, two, or more cables inserted into the wire connector, the central tab has a gripping portion and a multifunction tab member.

The wire connector may comprise exterior sloped wall members that are positioned on the proximal edge side and the distal edge side of the annular exterior stop member. The wire connector may also comprise a plurality of inner ribs positioned on the interior wall approximately opposite of the central tab hinge position. In preferred embodiments, the plurality of inner ribs have a dimensional barb depth of less than 30 thousandths of an inch. The wire connector may further comprise an optimized space between the central tab and the plurality of inner ribs for securely holding two or more cables simultaneously. The gripping portion of the central tab may comprise a plurality of integrated tab ribs. In some embodiments, the integrated tab ribs are disposed in an undulating profile facing said inner ribs. Some embodiments are capable of withstanding at least 37 lbs. of hanging weight attached to a first cable inserted and secured in the wire connector in a five minute pull test at room temperature and −25° C. without slipping more than 0.125 inch. Still further embodiments are capable of withstanding at least 30 lbs. of hanging weight attached to a first and a second cable inserted and secured in the wire connector in a five minute pull test for both said first and said second cables at room temperature and −25° C. without slipping more than 0.125 inch.

In some embodiments, the multifunction tab member is a multifunction knob. The multifunction knob may function in some embodiments as a means to easily allow inserted cable(s) into or out of the wire connector interior during installation or extraction, respectively. In further embodiments, the multifunction knob functions as a stop for the central tab when one or more cables is/are inserted into the wire connector. In preferred embodiments, the multifunction knob functions as a secondary spring with the central tab to apply further pressure on a cable(s) inserted into the wire connector, especially a second/wall cable when two or more cables are inserted into the wire connector.

In other embodiments, the multifunction tab member is at least one multifunction bumper, and preferably at least two multifunction bumpers. In some embodiments, the multifunction bumper(s) functions as a stop for the central tab when one or more cables is/are inserted into the wire connector. In preferred embodiments, the multifunction bumper(s) functions as a secondary spring with the central tab to apply further pressure on a cable(s) inserted into the wire connector, especially a second/wall cable when two or more cables are inserted into the wire connector.

In another aspect of the present invention, the wire connector comprises a body having an exterior wall, an interior wall, a proximal edge, a distal edge, and a longitudinal slot. The exterior wall comprises exterior sloped wall members extending outward from the exterior wall simulating an oval shape. The exterior wall also has an annular exterior stop member extending outward from the exterior wall. To apply pressure on the one, two, or more cables inserted into the wire connector, the interior wall has a central tab connected to the interior wall by a hinge portion and also has a plurality of inner ribs positioned on the interior wall approximately opposite of the central tab hinge portion. To better grip the one, two, or more cables inserted into the wire connector, the central tab has a gripping portion with a plurality of integrated tab ribs.

The wire connector may comprise exterior sloped wall members that are positioned on the proximal edge side and the distal edge side of the annular exterior stop member. The plurality of inner ribs may be sloped inward away from the interior wall such that an inner rib distance from the interior wall increases from the distal edge side toward the proximal edge side. In preferred embodiments, the plurality of inner ribs have a dimensional barb depth of less than 30 thousandths of an inch. The wire connector may be designed such that the longitudinal slot and simulated oval shape of the exterior sloped wall members accommodate tolerances for ½ inch or ¾ inch electrical box knockout holes. The wire connector may further comprise an optimized space between the central tab and the plurality of inner ribs for securely holding two or more cables simultaneously. The gripping portion of the central tab may comprise a plurality of integrated tab ribs. In some embodiments, the integrated tab ribs are disposed in an undulating profile facing said inner ribs. Some embodiments are capable of withstanding at least 37 lbs. of hanging weight attached to a first cable inserted and secured in the wire connector in a five minute pull test at room temperature and −25° C. without slipping more than 0.125 inch. Still further embodiments are capable of withstanding at least 30 lbs. of hanging weight attached to a first and a second cable inserted and secured in the wire connector in a five minute pull test for both said first and said second cables at room temperature and −25° C. without slipping more than 0.125 inch.

Some embodiments may further comprise a multifunction knob, wherein the multifunction knob creates a secondary spring function in the central tab when the multifunction knob is in a stop position. Further embodiments may further comprise at least two multifunction bumpers, wherein the at least two multifunction bumpers create a secondary spring function in the central tab when at least two multifunction bumpers are in a stop position.

In yet another aspect of the present invention, the wire connector comprises an interior space for receiving one or more cables, a means for applying pinching force on the one or more cables, wherein the pinching force means is associated with a central tab, and a first means for applying friction force on the one or more cables, wherein the first friction force means is associated with an interior wall of the wire connector. Some embodiments may further comprise a second means for applying friction force on the one or more cables, wherein the second friction force means is associated with a gripping portion of the central tab. In some embodiments, the pinching force means is a multifunction knob. In further embodiments, the pinching force means is at least two multifunction bumpers. The first friction means may be a plurality of inner ribs in some embodiments. The second friction means may be a plurality of integrated tab ribs in some embodiments.

In still yet another aspect of the present invention, a method for securing one, two, or more cables in an electrical box is provided comprising installing at least one wire connector as disclosed herein into an electrical box knockout hole and securing at least a first cable into the wire connector such that a first cable may be secured between the central tab gripping portion of the central tab and the plurality of inner ribs. In preferred embodiments, the method includes securing a second cable into the wire connector as disclosed herein.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
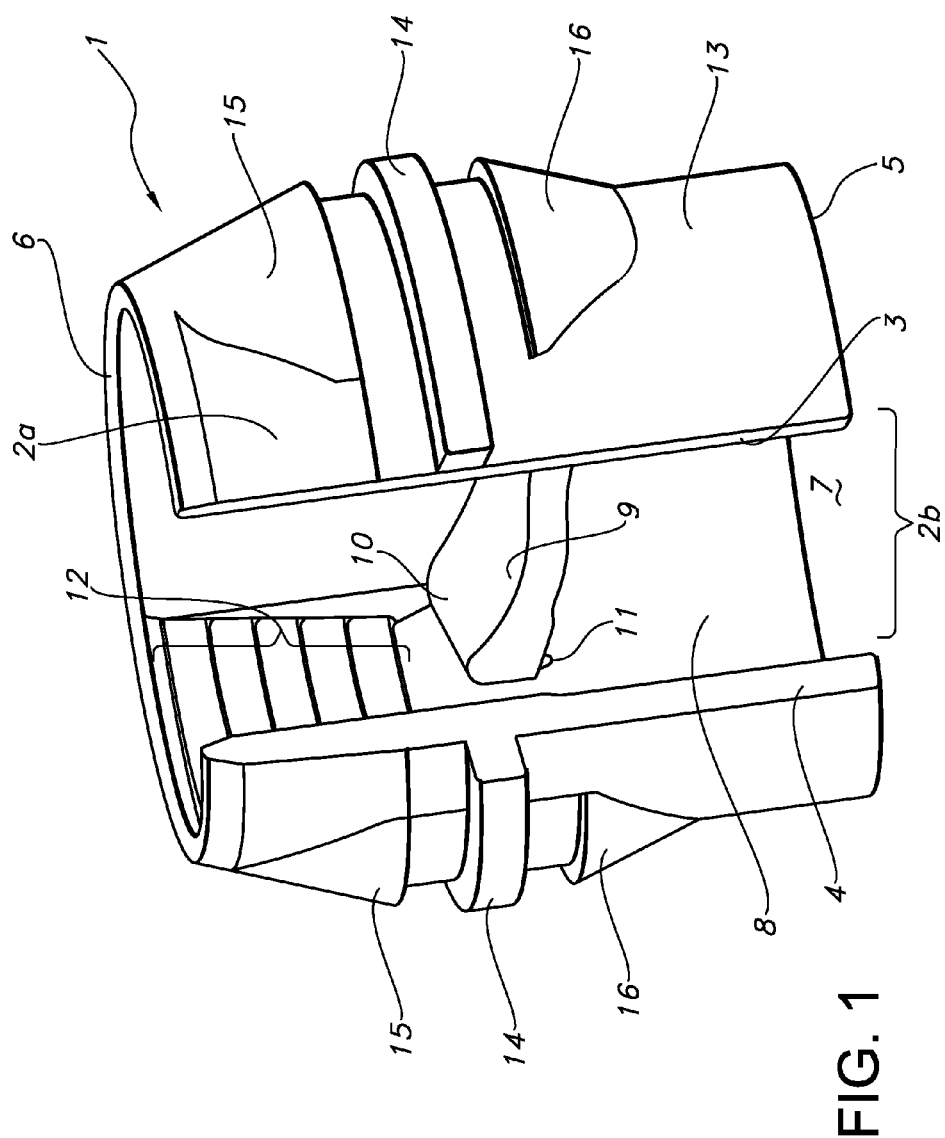
FIG. 1 depicts a perspective view of an embodiment of a wire connector according to the present disclosure.

The above and other features, aspects and, advantages of the present invention will now be discussed in the following detailed description of the preferred embodiments and appended claims, which are to be considered in conjunction with the accompanying drawings in which identical reference characters designate like elements throughout the views. The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples.

Referring to the drawings, FIG. 1 illustrates a perspective view of an exemplary embodiment of the present invention, which is an improved wire connector 1 for securing more than one cable in an electrical box knockout hole. As can be seen in FIG. 1, the wire connector 1 is comprised of a body 2a with a longitudinal slot 2b between first and second slot edges 3,4. Body 2a can be any tubular shape suitable for insertion in an electrical box knockout hole with an interior space 7 to receive inserted wires. Preferably, body 2a is substantially cylindrical. The longitudinal slot 2b is designed to allow contraction of the slot by squeezing (compressing) slot edges 3,4 together for inserting the wire connector 1 into an electrical box knockout hole. The squeezing or compression action necessary for installing the wire connector 1 into an open electrical box knockout hole can be achieved by hand or any appropriate tool available to the installer or user. Similarly, this squeezing or compression action can be used for removing an installed wire connector 1 from an open electrical box knockout hole. Once the squeezing action is discontinued, the resiliency of the wire connector 1 returns it to its original shape, as permitted, of course, by any restrictions due to its placement in an electrical box knockout hole.

The wire connector 1 also consists of a circumferential/annular proximal edge 5 and a circumferential/annular distal edge 6. The longitudinal slot 2b interrupts the circumferential/annular proximal edge 5 and the circumferential/annular distal edge 6. One, two, or more cables are fed or threaded into the interior 7 of the installed wire connector 1 (preferably at the proximal edge 5 side) and pushed through to the electrical cable box passing the distal edge 6. The interior 7 of the wire connector 1 body 2a has an interior wall 8, which has, on approximately opposing sides, a central tab 9 with gripping portion 10 and a plurality of integrated tab ribs 11 and a plurality of inner ribs 12. The integrated tab ribs 11 are positioned on the gripping portion 10 of the central tab 9 edge nearest the inner ribs 12. The integrated tab ribs 11 are designed to grip an inserted cable without cutting through the outer sheath or insulation of the inserted cable. Thus, the integrated tab ribs 11 are a means for applying a friction force on a cable inserted into the wire connectors 1. To ensure that the integrated tab ribs 11 do not cut through the outer sheath or insulation of the inserted cable, the integrated tab ribs 11 are designed to have a dimensional size less than the dimensional size of the outer sheath or insulation of cables, especially 14/2-10/2 and 14/3-6/3 cable gauges, for example, but not limiting, such as ROMEX® SIMPULL® by Southwire (Carrollton, Ga.). The integrated tab ribs 11 are further designed to apply some grip on a cable when force is applied to the cable in either direction. Opposite the gripping portion 10 of the central tab 9 are positioned a plurality of inner ribs 12. The inner ribs 12 are positioned on the interior wall 8 to grip an inserted cable without cutting through the outer sheath or insulation of the inserted cable. To ensure that the inner ribs 12 do not cut through the outer sheath or insulation of the inserted cable, the inner ribs 12 are designed to have a dimensional size less than the dimensional size of the outer sheath or insulation of cables, especially 14/2-10/2 and 14/3-6/3 cable gauges, for example, but not limiting, such as ROMEX® SIMPULL® by Southwire (Carrollton, Ga.). The inner ribs 12 are further designed to be angled to grip an inserted cable when force is applied to pull a cable out of the electrical box.

The exterior wall 13 of the wire connector 1 comprises a circumferential/annular rib or stop 14 positioned between a first sloped wall member 15 and a second sloped wall member 16, wherein the first sloped wall member 15 is positioned on the distal edge side of rib 14 and the second sloped wall member 16 is positioned on the proximal edge side of rib 14. The circumferential/annular rib or stop 14 is interrupted by longitudinal slot 2b. Mirror-imaged sloped wall members 15,16 are positioned on the exterior wall 13 to simulate an oval shape O (shown as dotted oval line in FIG. 2 for sloped wall members 15). The advantage of the simulated oval shape O of the sloped wall members 15,16 is that it improves the "snap fit" of wire connector 1 in a variety of applications. In testing a variety of shapes, the best geometry to snap an tubular wire connector, such as the preferred shape of wire connector 1, into a variety of round hole sizes, such as electrical box knockout holes, and maintain a tight fit was discovered to be an oval shape. Knockout holes come in variety of sizes, and each hole size (common sizes include ½ inch and ¾ inch) has its own acceptable tolerance for under and over sizing. However, it is very difficult to manufacture such an oval shape with a round inner body by the plastic injection molding process. Therefore, wire connector 1 was designed to simulate an oval shaped outer body by having sloped wall members 15,16 positioned in an opposite and a discontinuous manner on the exterior wall 13. Together with longitudinal slot 2b, the large diameters and small diameters of this oval shape O are designed to fit standardized knockout hole tolerances of electrical boxes.

In some embodiments, wire connector 1 of the present invention is designed to fit ½ inch knockout holes and be compatible with the full range of industry acceptable size tolerances in US and/or Canada of 0.8 inch to 0.906 inch. In other embodiments, wire connector 1 of the present invention is designed to fit ¾ inch knockout holes and be compatible with the full range of industry acceptable size tolerances in US and/or Canada of 1.065 inch to 1.140 inch.

Thus, wire connector 1 of the appropriate sizing can accommodate these large tolerances while allowing wire connector 1 to be easily removed from an electrical box knockout hole when desirable or necessary. This feature can be seen in FIG. 2, where the large difference of minimum (W-1) and maximum (W-2) widths of wire connector 1 will accommodate the varying tolerance widths of electrical box knockout holes due to the simulated oval shape O. This is accomplished by the oval shape O because the smaller dimension W-1 does not significantly vary as a user installs the wire connector 1, while the larger dimension W-2 will become smaller as the user squeezes or compresses the wire connector 1 during installation into a knockout hole. A person of skill in the art will appreciate that the smaller dimension W-1 will be smaller than the lowest tolerance width of a knockout hole and the larger dimension W-2 will conform to even the largest tolerance width of a knockout hole when the wire connector 1 is allowed to relax when compression is removed (i.e., the wire connector 1 will only be significantly compressed within the larger dimension W-2 during installation or removal from a knockout hole). Thus, the sloped wall members 15,16 creating the larger dimension W-2 will ensure that the wire connector 1 is securely held in knockout holes within the full range of tolerances. In preferred embodiments, longitudinal slot 2b is calibrated by attentively considering the minimum dimension W-1 needed for the lowest tolerance width and the residual contractive forces within the resilient material of the wire connector body 2a following the solidification of the molten resilient material during the injection process. This calibration of longitudinal slot 2b likewise allows for the compression of the larger dimension W-2 during installation to reach a size smaller than the lowest tolerance size of the knockout hole. As can be appreciated in FIGS. 1 and 3, another advantageous feature of the wire connector 1 is the configuration of sloped wall members 15,16 positioned on both sides of rib 14 permits wire connector 1 to be installed in an electrical box knockout hole from the inside or the outside of the electrical box, and, if desired, in either orientation (i.e., with distal edge inside or outside of the electrical box).

Figure 2:
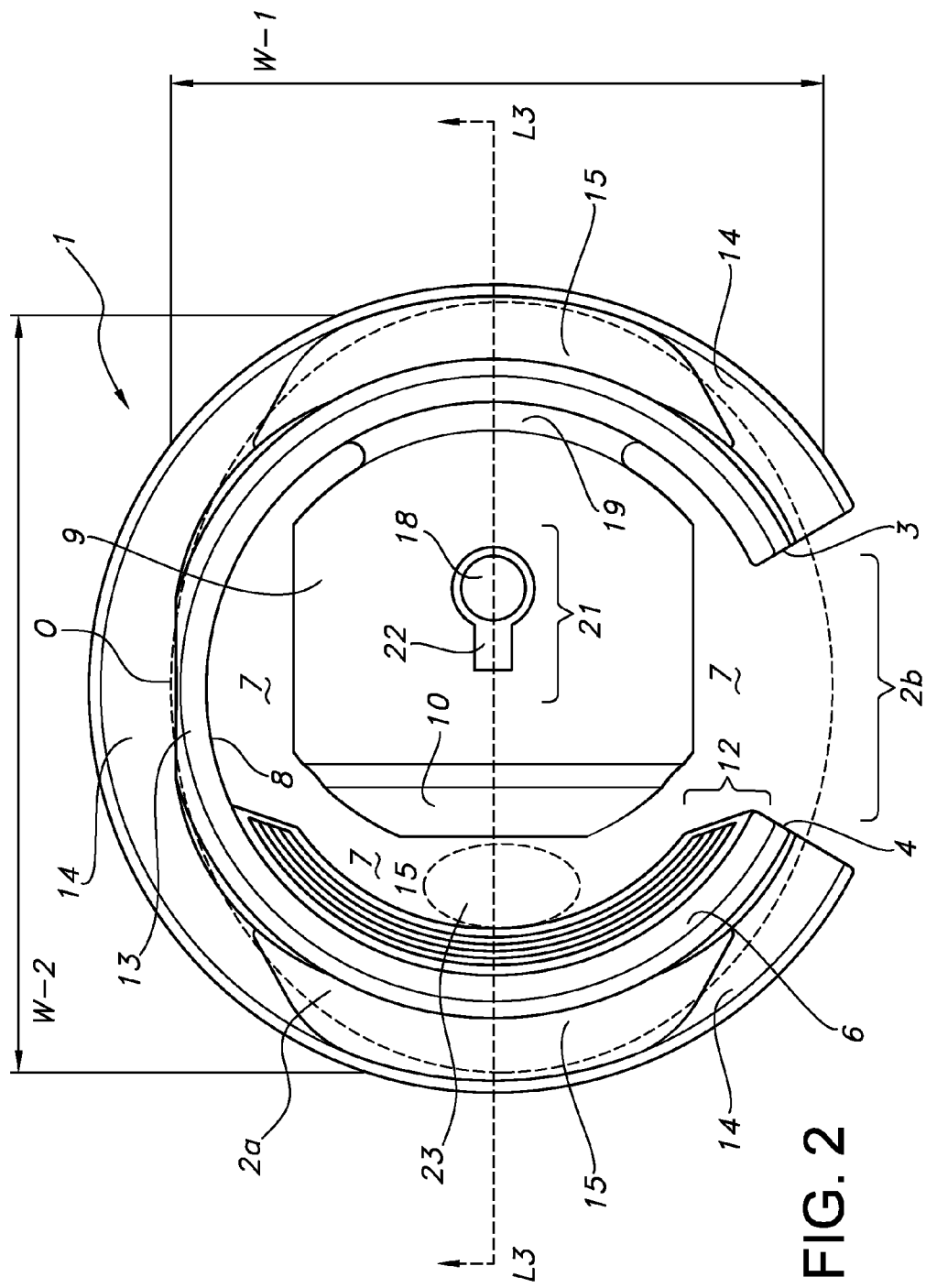
FIG. 2 is a top plan view of the wire connector of FIG. 1 from a vantage of the top of the central tab 9 and multifunction knob 18.

Also shown in FIG. 2 is a top plan view of the wire connector 1 from a vantage of the top of the central tab 9 with a multifunction tab member (here, a multifunction knob 18). The central tab 9 is connected to the interior wall 8 of the wire connector 1 at hinge 19. Hinge 19 is responsible for applying pressure on a cable inserted into the wire connector 1. When more than one cable is inserted into the wire connector 1, the hinge 19 applies pressure on a first cable, which, in turn, exerts force on a second cable. The multifunction knob 18 is positioned approximately in the middle of central tab 9. As the name implies, the multifunction knob 18 performs a plurality of functions, as can be appreciated in FIG. 3, which shows a cross-section view of the wire connector 1 as viewed along Line 3-3 of FIG. 2. First, multifunction knob 18 can be used by an installer or user to pull back the central tab 9 to more easily insert one or more cables into wire connector 1. Second, multifunction knob 18 can be used by an installer or user to pull back the central tab 9 while retracting one or more cables out of wire connector 1. Third, multifunction knob 18 acts as a stop ("stop position" 20, seen as the dotted profile in FIG. 3 and the activated wire connector 1 shown in FIG. 4) when the width of the cables inserted into wire connector 1 reaches or exceeds its capacity. Fourth, multifunction knob 18, when in the stop position 20, creates a secondary spring function in area 21 of central tab 9 including the multifunction knob 18 and the sloped member 22.

Figure 4:
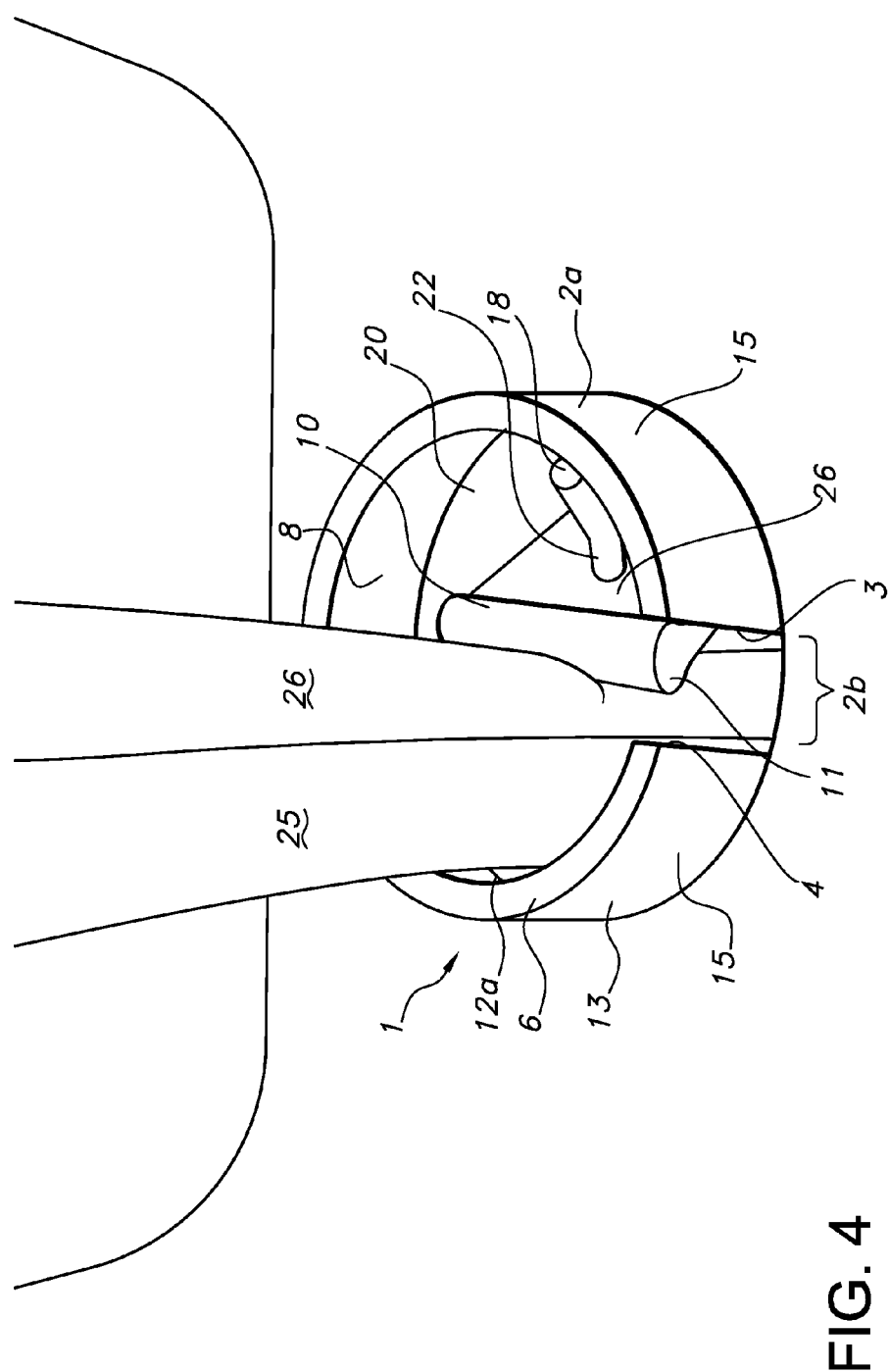
FIG. 4 is a perspective view of an activated wire connector of the present disclosure installed in an electrical box and connecting two cables 25,26 from a vantage within the electrical box.

This secondary spring function provides additional force for the central tab 9 to secure the cable(s) inserted into wire connector 1. This force is created by the hinge 19, which, when deformed by pushing or pulling the central tab 9 upwards, works to force the central tab 9 back down to its original position, therefore, applying pressure on a first or, preferably, on a first and a second inserted cable. However, this pressure alone may be insufficient to pass a pull test (discussed further in the examples, below) for a second inserted cable in known wire connectors. Therefore, the present invention includes a secondary spring area 21 that is designed to increase the frictional force on a second inserted cable (as seen in FIG. 4; the second or "wall cable" 25) positioned between the inner ribs 12 and a first inserted cable (as seen in FIG. 4; the first or "tab cable" 26). Without being bound by a particular theory, it is believed that a wall cable is held in a wire connector, such as wire connector 1, purely by friction. The extra pressure is generated by multifunction knob 18 in the secondary spring area 21, which is strategically positioned to be "bent" onto the interior wall 8 of the wire connector 1 when two cables are inserted into the connector (see FIG. 4). The sloped member 22 adds structural support to the multifunction knob 18 when it is "bent" in the stop position 20 and aids in transferring force to the inserted cables. Thus, the central tab 9 then acts like a secondary spring pushing the central tab 9 back downwards and transferring extra pressure onto a wall cable 25.

As shown in FIG. 2, wire connector 1 has an optimized (small enough to provide sufficient friction but large enough not to cut wire sheathing) gap 23 between the grip portion 10 of central tab 9 and inner ribs 12. The size of hinge 19, the optimized gap 23, and the multifunction knob 18 work together to improve the "pinching" force on a wall cable 25. Thus, the central tab 9 acts as a means for applying pinching force on a cable inserted into the wire connector 1. In some embodiments, hinge 19, the optimized gap 23, and secondary spring function of the central tab 9 with multifunction knob 18 are calibrated to hold more than 25 lbs. in a pull test, which is further explained in the examples below. In preferred embodiments, hinge 19, the optimized gap 23, and secondary spring function of the central tab 9 with multifunction knob 18 are calibrated to hold more than 35 lbs. in a pull test of a single inserted cable and more than 30 lbs. in a pull test of each of a first and a second inserted cable.

Figure 3:
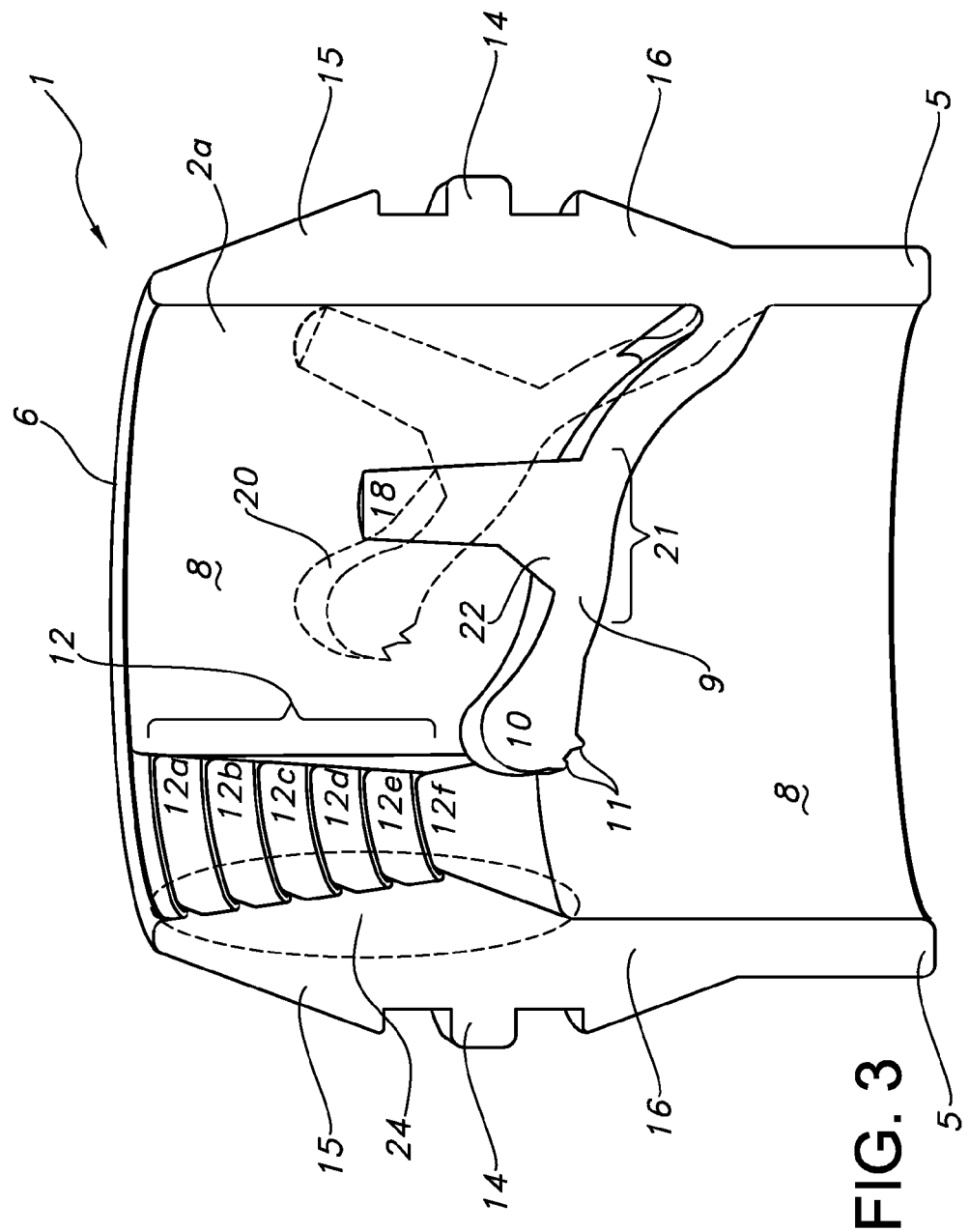
FIG. 3 is a cross-section view of the wire connector as viewed along line 3-3 of FIG. 2.

The inner ribs 12a-12f are designed as miniature barbs opposing a pullout force. The interior wall 8 opposite the central tab 9 gripping portion 10 is gently sloped toward the central tab 9 and interior 7 such that the rib 12f furthest from the distal edge 6 is elevated the most in relation to the interior wall 8. In some embodiments, the interior wall 8 contains no slope. In preferred embodiments, the interior wall 8 contains a minimum slope for maximizing a friction force on a wall cable (all inner ribs 12 are equally in contact with a wall cable) while also aiding the de-molding process of manufacturing by injection molding. Thus, the inner ribs 12 are a means for applying a friction force on a cable inserted into the wire connectors 1. The slope necessary to maintain the integrity of structures like inner ribs 12 in de-molding is well known in the art of injection molding to be dependent on the size of such structures. The inner ribs 12 are also purposefully slanted to allow the product to de-mold without being destroyed or losing their functionality. Shown in FIG. 3 is the preferred construction of inner ribs 12 in a sloped configuration 24. The sloped configuration 24 can vary depending on the desired grip needed in the inner ribs 12 as described above. Furthermore, the inner ribs 12 are very short and sharp as the design intent is to grip the wall cable 25 without piercing its outer jacket. Indeed a cable jacket is thicker than the length of the barbs of inner ribs 12. Cable jackets of wires used in conjunction with wire connectors 1 like those of the present invention have a jacket of 30 thousandths of an inch. In some embodiments, inner ribs 12 are designed to range in dimensional length of less than 30 thousandths of an inch. In preferred embodiments, inner ribs 12 have a barb dimensional length of about 8 to 25 thousandths of an inch. In further preferred embodiments, inner ribs 12 have a barb dimensional length of about 10 to 20 thousandths of an inch. In more preferred embodiments, inner ribs 12 have a barb dimensional length of about 15 thousandths of an inch. Therefore, the barbs cannot cut through the cable sheathing to expose the conductor inside. As can be appreciated in FIGS. 1 and 3, the inner ribs 12 consist of a plurality of ribs. In preferred embodiments, the inner ribs 12 consist of between three (3) and ten (10) ribs, inclusive. In more preferred embodiments, the inner ribs 12 consist of between four (4) and eight (8) ribs, inclusive. In further preferred embodiments, the inner ribs 12 consist of six (6) ribs.

FIG. 4 illustrates an exemplary application of an embodiment of the wire connector 1 securing two inserted cables in an "activated" state. First, the wire connector 1 is installed into an open electrical box knockout hole. Next, a first ("tab") cable 26 is inserted and secured in the wire connector 1. The wire connector 1 maintains the "pinch" feature used by known wire connectors to secure a tab cable 26. However, the central tab 9 has been redesigned in order to maximize the pinch force without piercing the cable sheathing. The central tab 9 geometry, hinge 19 size, and integrated tab ribs 11 are the design features that achieve this objective. Then, a second ("wall") cable 25 is inserted and secured in the wire connector 1. As for the wall cable 25, it is not retained in place due to a pinching force, but rather due to a purely frictional force. As previously discussed, the frictional force securing wall cable 25 is supplied by a combination of the inner ribs 12, the central tab 9, hinge 19, the tab cable 26, and the secondary spring function of the multifunction knob 18. A person of ordinary skill in the art would readily appreciate that the first/tab cable 26 and the second/wall cable 25 can be inserted and secured in the wire connector 1 simultaneously, or one at a time as described above.

Figure 5:
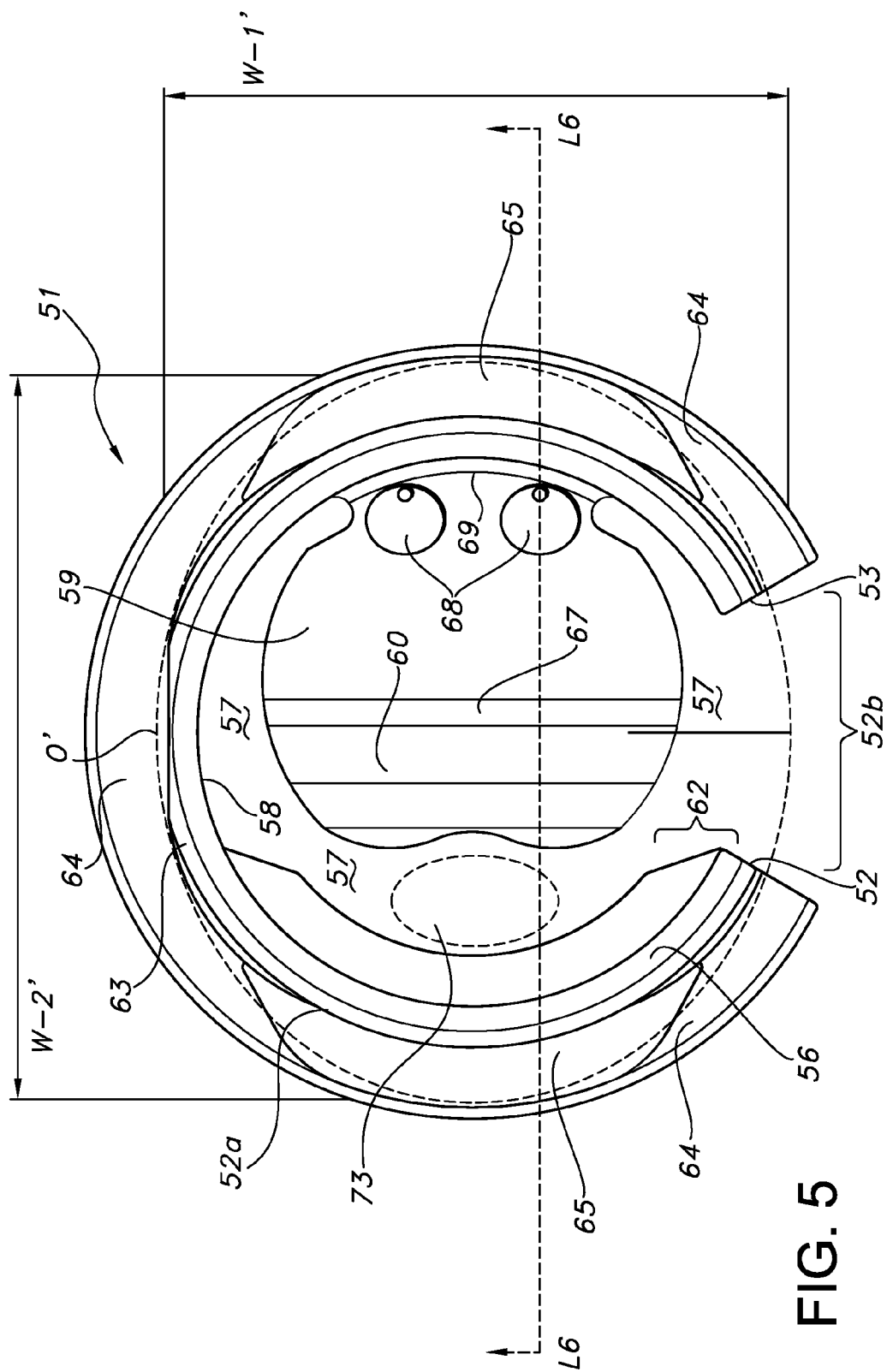
FIG. 5 is a top plan view of another embodiment of the wire connector according to the present disclosure from a vantage of the top of the central tab 59 and multifunction bumpers 68.
Figure 6A:
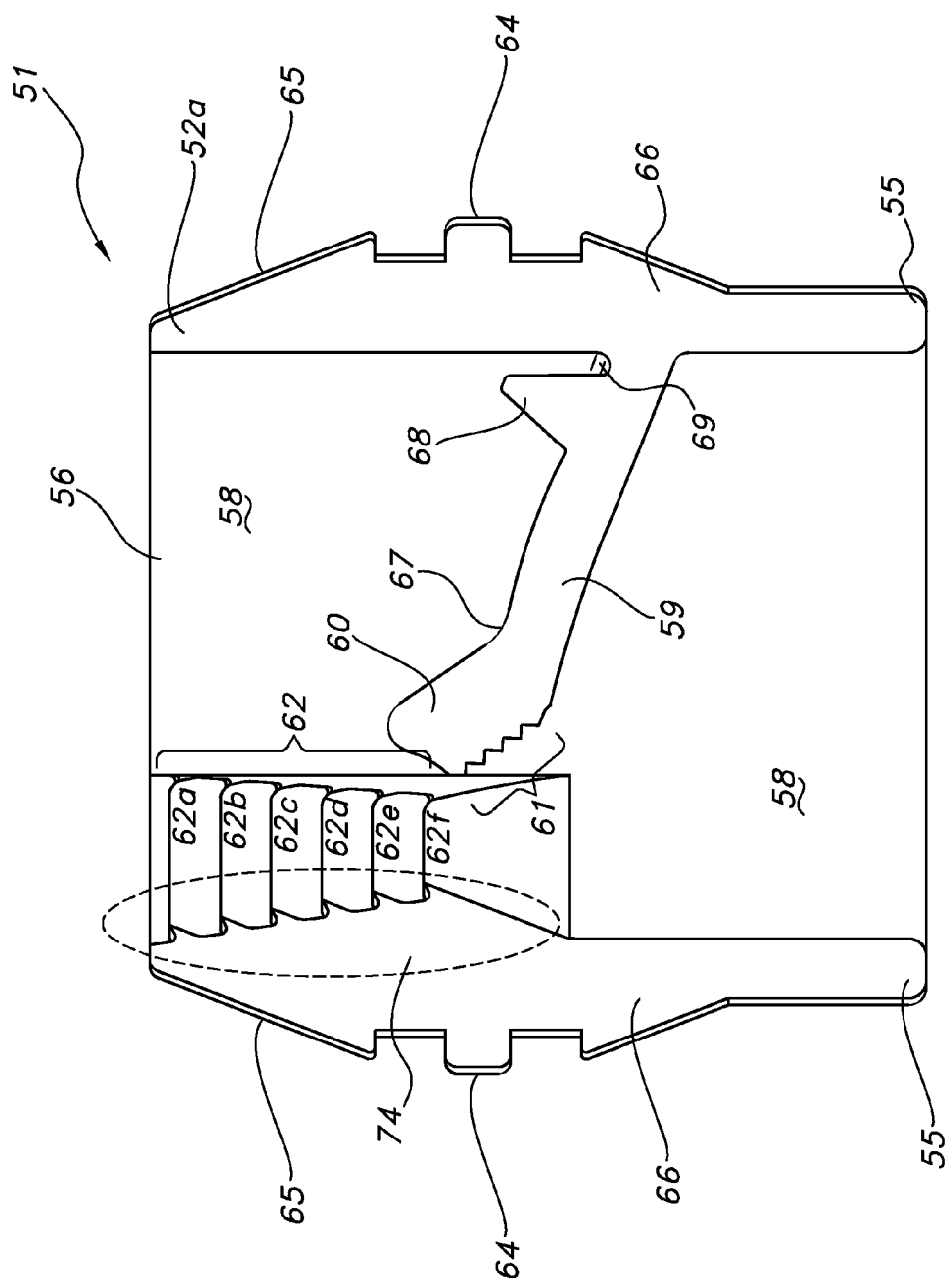
FIG. 6A is a cross-section view of the wire connector as viewed along line 6-6 of FIG. 5.

Referring now to FIGS. 5 and 6A, a top plan view is shown of another exemplary embodiment of the present invention, which is an improved wire connector 51 for securing one or more cables in an electrical box knockout hole. As can be seen in FIG. 5, the wire connector 51 is comprised of a body 52a with a longitudinal slot 52b between first and second slot edges 53,54. Body 52a can be any tubular shape suitable for insertion in an electrical box knockout hole with an interior space 57 to receive an inserted wire or wires. Preferably, body 52a is substantially cylindrical. The longitudinal slot 52b is designed to allow contraction of the slot by squeezing first and second slot edges 53 and 54 together for inserting the wire connector 51 into an electrical box knockout hole. The squeezing action necessary for installing the wire connector 51 into an open electrical box knockout hole can be achieved by hand or any appropriate tool available to the installer or user. Similarly, this squeezing action can be used for removing an installed wire connector 51 from an open electrical box knockout hole. Once the squeezing action is discontinued, the resiliency of the wire connector 51 returns it to its original shape, as permitted, of course, by any restrictions due to its placement in an electrical box knockout hole.

The wire connector 51 also consists of a circumferential/annular proximal edge 55 and a circumferential/annular distal edge 56. As can be seen in FIG. 5, the longitudinal slot 52b interrupts the circumferential/annular proximal edge 55 and the circumferential/annular distal edge 56. One, two, or more cables are fed or threaded into the interior 57 of the installed wire connector 51 (preferably at the proximal edge 55 side) and pushed through to the electrical cable box passing the distal edge 56. The interior 57 of the wire connector 51 body 52a has an interior wall 58, which has, on approximately opposing sides, a central tab 59 with gripping portion 60 and a plurality of integrated tab ribs 61 and a plurality of inner ribs 62. The integrated tab ribs 61 are positioned on the gripping portion 60 of the central tab 59 edge nearest the inner ribs 62. The integrated tab ribs 61 are designed to grip an inserted cable without cutting through the outer sheath or insulation of the inserted cable. Thus, the integrated tab ribs 61 are a means for applying a friction force on a cable inserted into the wire connectors 51. To ensure that the integrated tab ribs 61 do not cut through the outer sheath or insulation of the inserted cable, the integrated tab ribs 61 are designed to have a dimensional size less than the dimensional size of the outer sheath or insulation of cables, especially 14/2-10/2 and 14/3-6/3 cable gauges, for example, but not limiting, such as ROMEX® SIMPULL® by Southwire (Carrollton, Ga.). The integrated tab ribs 61 are further designed to apply some grip on a cable when force is applied to the cable in either direction. Some embodiments, see FIG. 6A, comprise integrated tab ribs 61 that are sharp and squared in a step pattern to better grip an inserted cable positioned to contact the integrated tab ribs 61. Opposite the gripping portion 60 of the central tab 59 are positioned a plurality of inner ribs 62. The inner ribs 62 are positioned on the interior wall 58 to grip an inserted cable without cutting through the outer sheath or insulation of the inserted cable. To ensure that the inner ribs 62 do not cut through the outer sheath or insulation of the inserted cable, the inner ribs 62 are designed to have a dimensional size less than the dimensional size of the outer sheath or insulation of cables, especially 14/2-10/2 and 14/3-6/3 cable gauges, for example, but not limiting, such as ROMEX® SIMPULL® by Southwire (Carrollton, Ga.). The inner ribs 62 are further designed to be angled to grip an inserted cable when force is applied to pull a cable out of the electrical box.

Figure 6B:
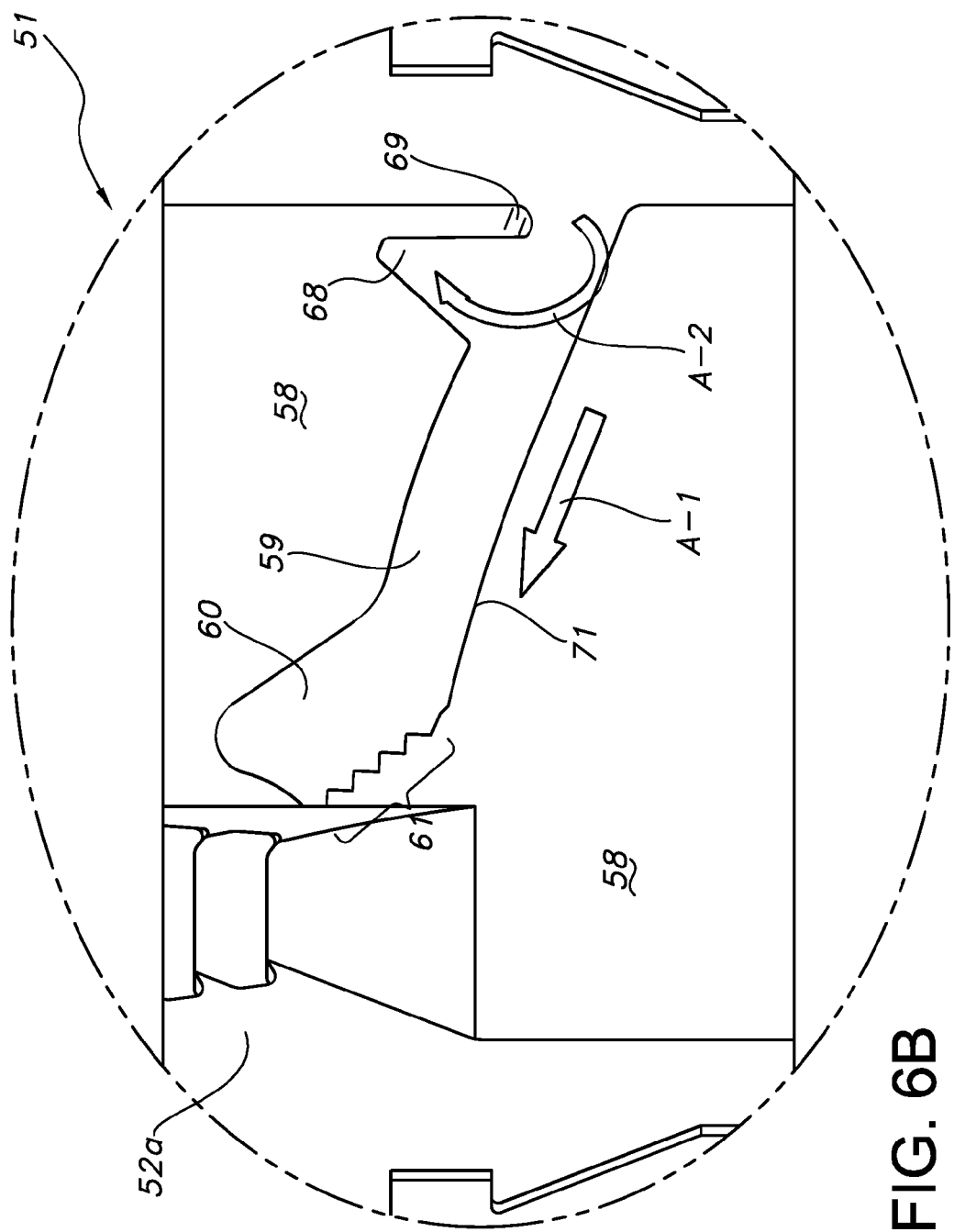
FIG. 6B is a close up cross-section view of the wire connector as viewed along line 6-6 showing the flat and sloped proximal surface 71 of central tab 59 assists in the threading of a cable through the wire connector and the hinge 69 motion when a cable is inserted.
Figure 6C:
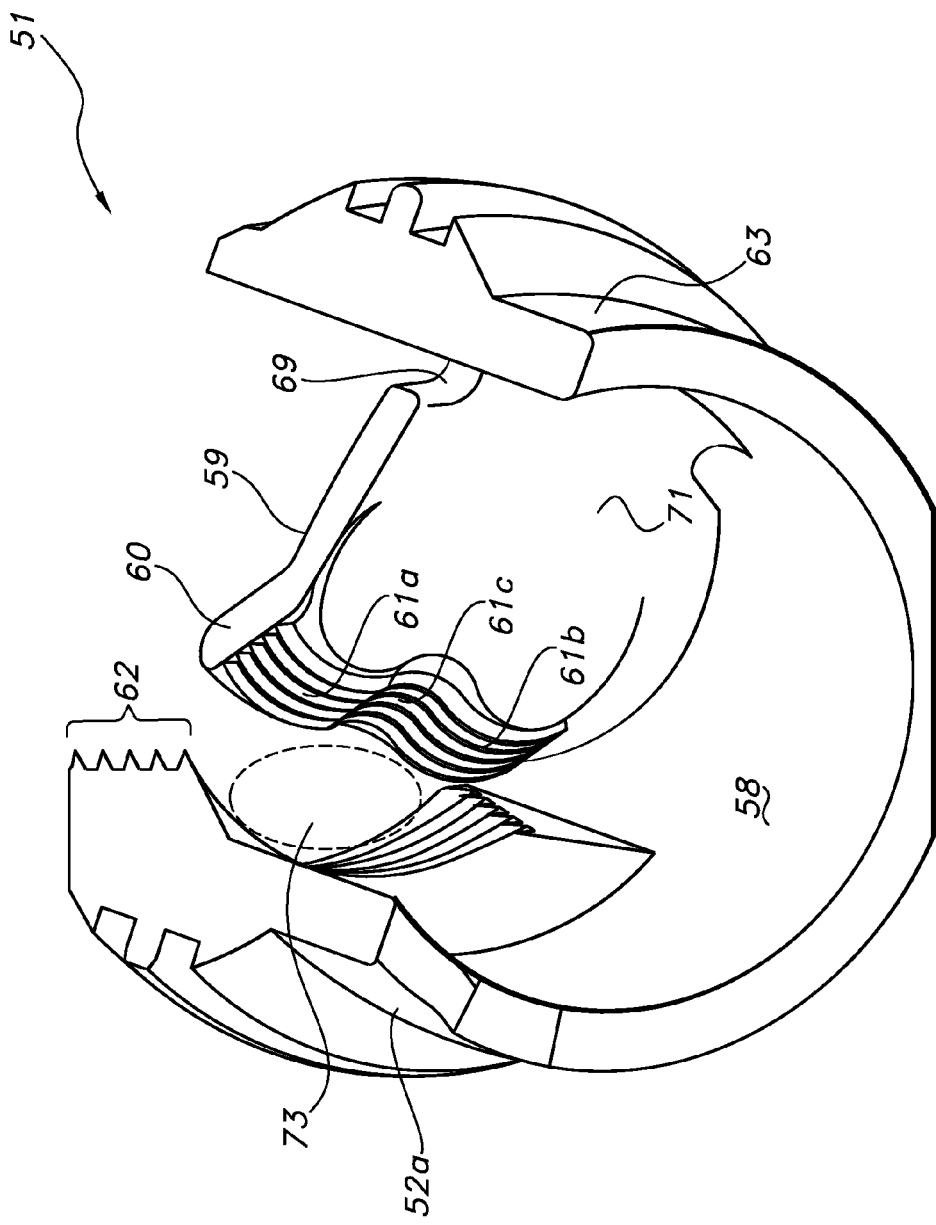
FIG. 6C is a perspective cross-section view of the wire connector as viewed along line 6-6 from a vantage of the bottom (proximal) side of the central tab showing the elevated and depressed portions of integrated tab ribs 61.

In some embodiments, the gripping portion 60 is designed to have a flat or blunt profile facing the inner ribs 62 such that the integrated tab ribs 61 are a "presented" to an inserted cable(s) in a substantially straight line (see FIG. 2). In other embodiments, the gripping portion 60 is designed to have a curved or rounded profile facing the inner ribs 62 such that the integrated tab ribs 61 are a "presented" to an inserted cable(s) with varying distance from the inner ribs 62 (see FIG. 5). In preferred embodiments, wire connector 51 has a gripping portion 60 that is designed to have an undulating profile facing the inner ribs 62 such that the integrated tab ribs 61 are a "presented" to an inserted cable(s) with varying distance from the inner ribs 62 where there is a first elevated tab rib portion 61a and a second elevated tab rib portion 61b that are disposed on either side of the gripping portion 60 and are separated by a recessed tab rib portion 61c that creates a larger gap between the inner ribs 62 and the gripping portion 60 at its (60) center (see FIG. 6C). The undulating shape of gripping portion 60 with elevated tab rib portions 61a and 61b and recessed tab rib portion 61c allows for convenient gripping and/or "pinching" positioning of an inserted cable (72 in FIGS. 7A & 7B) or inserted cables (75 & 76 in FIGS. 8A & 8B), especially two and three wire cables. Also, the undulating shape of gripping portion 60 with elevated tab rib portions 61a and 61b and recessed tab rib portion 61c allows for better gripping of a tab cable (76 in FIGS. 8A & 8B) by integrated tab ribs 61 because more surface area of integrated tab ribs 61 will come into contact with the tab cable.

Referring now to FIG. 6A, the exterior wall 63 of the wire connector 51 comprises a circumferential/annular rib or stop 64 positioned between a first sloped wall member 65 and a second sloped wall member 66, wherein the first sloped wall member 65 is positioned on the distal edge side of rib 64 and the second sloped wall member 66 is positioned on the proximal edge side of rib 64. The circumferential/annular rib or stop 64 is interrupted by longitudinal slot 52b, see FIG. 5. Mirror-imaged sloped wall members 65,66 are positioned on the exterior wall 63 to simulate an oval shape O' (shown as dotted oval line in FIG. 5 for sloped wall members 65). The advantage of the simulated oval shape O' of the sloped wall members 65,66 is that it improves the "snap fit" of wire connector 51 in a variety of applications. In testing a variety of shapes, the best geometry to snap a tubular wire connector, such as the preferred shape of wire connector 51, into a variety of round hole sizes, such as electrical box knockout holes, and maintain a tight fit was discovered to be an oval shape. Knockout holes come in variety of sizes, and each hole size (common sizes include ½ inch and ¾ inch) has its own acceptable tolerance for under and over sizing. However, it is very difficult to manufacture such an oval shape with a round inner body by the plastic injection molding process. Therefore, wire connector 51 was designed to simulate an oval shaped outer body by having sloped wall members 65,66 positioned in an opposite and a discontinuous manner on the exterior wall 63. Together with longitudinal slot 52b, the large diameter and small diameter of this oval shape O' are designed to fit standardized knockout hole tolerances of electrical boxes.

In some embodiments, wire connector 51 of the present invention is designed to fit ½ inch knockout holes and be compatible with the full range of industry acceptable size tolerances in US and/or Canada of 0.8 inch to 0.906 inch. In other embodiments, wire connector 51 of the present invention is designed to fit ¾ inch knockout holes and be compatible with the full range of industry acceptable size tolerances in US and/or Canada of 1.065 inch to 1.140 inch. Thus, wire connector 51 of the appropriate sizing can accommodate these large tolerances while allowing wire connector 51 to be easily removed from an electrical box knockout hole when desirable or necessary. This feature can be seen in FIG. 5, where the large difference of minimum (W-1') and maximum (W-2') widths of wire connector 51 will accommodate the varying tolerance widths of electrical box knockout holes due to the simulated oval shape O'. This is accomplished by the oval shape O' because the smaller dimension W-1' does not significantly vary as a user installs the wire connector 51, while the larger dimension W-2' will become smaller as the user squeezes or compresses the wire connector 51 during installation into a knockout hole. A person of skill in the art will appreciate that the smaller dimension W-1' will be smaller than the lowest tolerance width of a knockout hole and the larger dimension W-2' will conform to even the largest tolerance width of a knockout hole when the wire connector 51 is allowed to relax when compression is removed (i.e., the wire connector 51 will only be significantly compressed within the larger dimension W-2' during installation or removal from a knockout hole). Thus, the sloped wall members 65,66 creating the larger dimension W-2' will ensure that the wire connector 51 is securely held in knockout holes within the full range of tolerances. In preferred embodiments, longitudinal slot 52b is calibrated by attentively considering the minimum dimension W-1' needed for the lowest tolerance width and the residual contractive forces within the resilient material of the wire connector body 52a following the solidification of the molten resilient material during the injection process. This calibration of longitudinal slot 52b likewise allows for the compression of the larger dimension W-2' during installation to reach a size smaller than the lowest tolerance size of the knockout hole. As can be appreciated in FIGS. 5 and 6A, another advantageous feature of the wire connector 51 is the configuration of sloped wall members 65,66 positioned on both sides of rib 64 permits wire connector 51 to be installed in an electrical box knockout hole from the inside or the outside of the electrical box, and, if desired, in either orientation (i.e., with distal edge inside or outside of the electrical box).

Figures 7A, 7B:
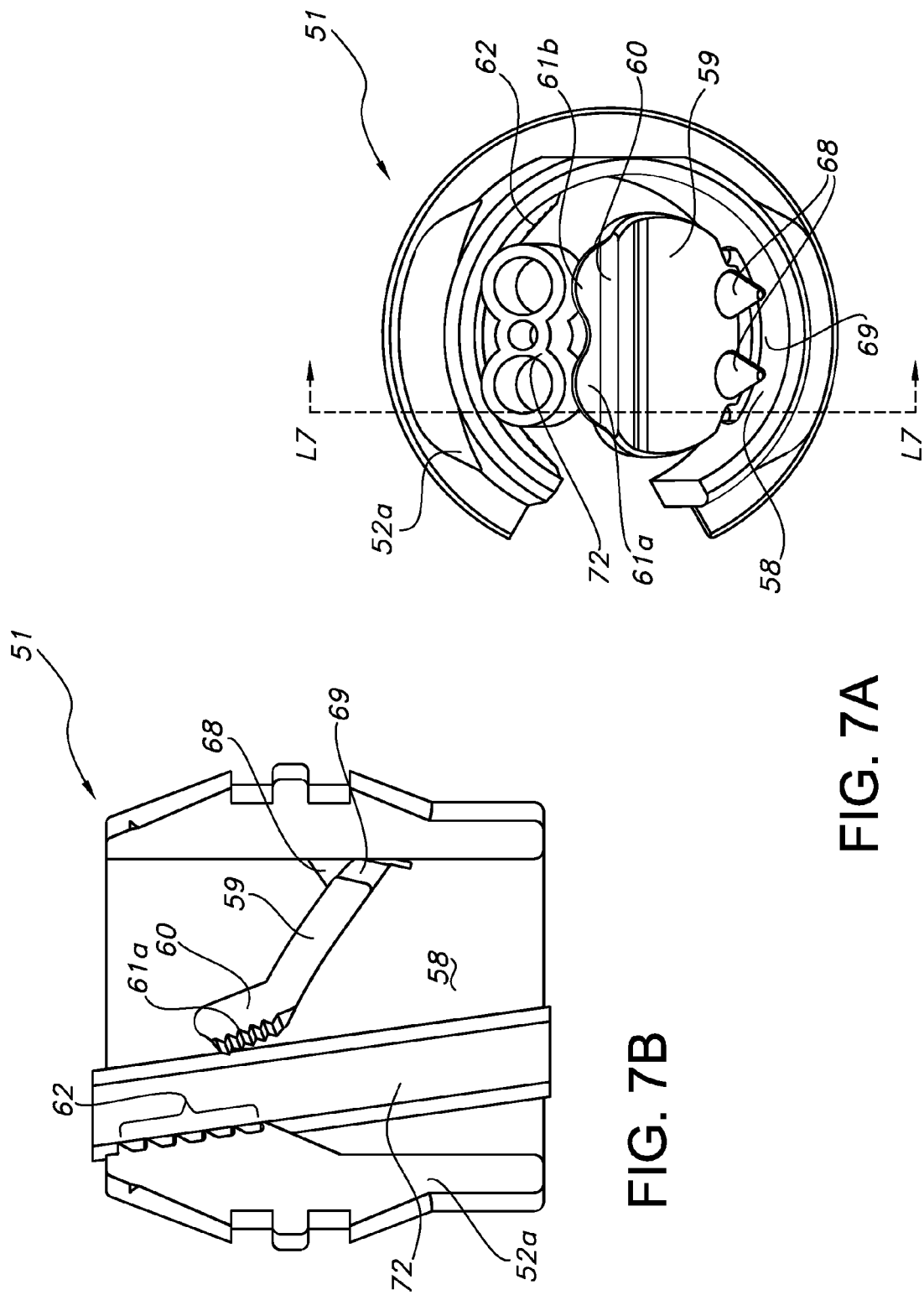
FIG. 7A is a top plan view of the wire connector of FIG. 5 from a vantage of the top of the central tab 59 and multifunction bumpers 68 with a single cable 72 inserted in the wire connector.
FIG. 7B is a cross-section view of the wire connector as viewed along line 7-7 of FIG. 7A with a single cable 72 inserted in the wire connector.
Figures 8A, 8B:
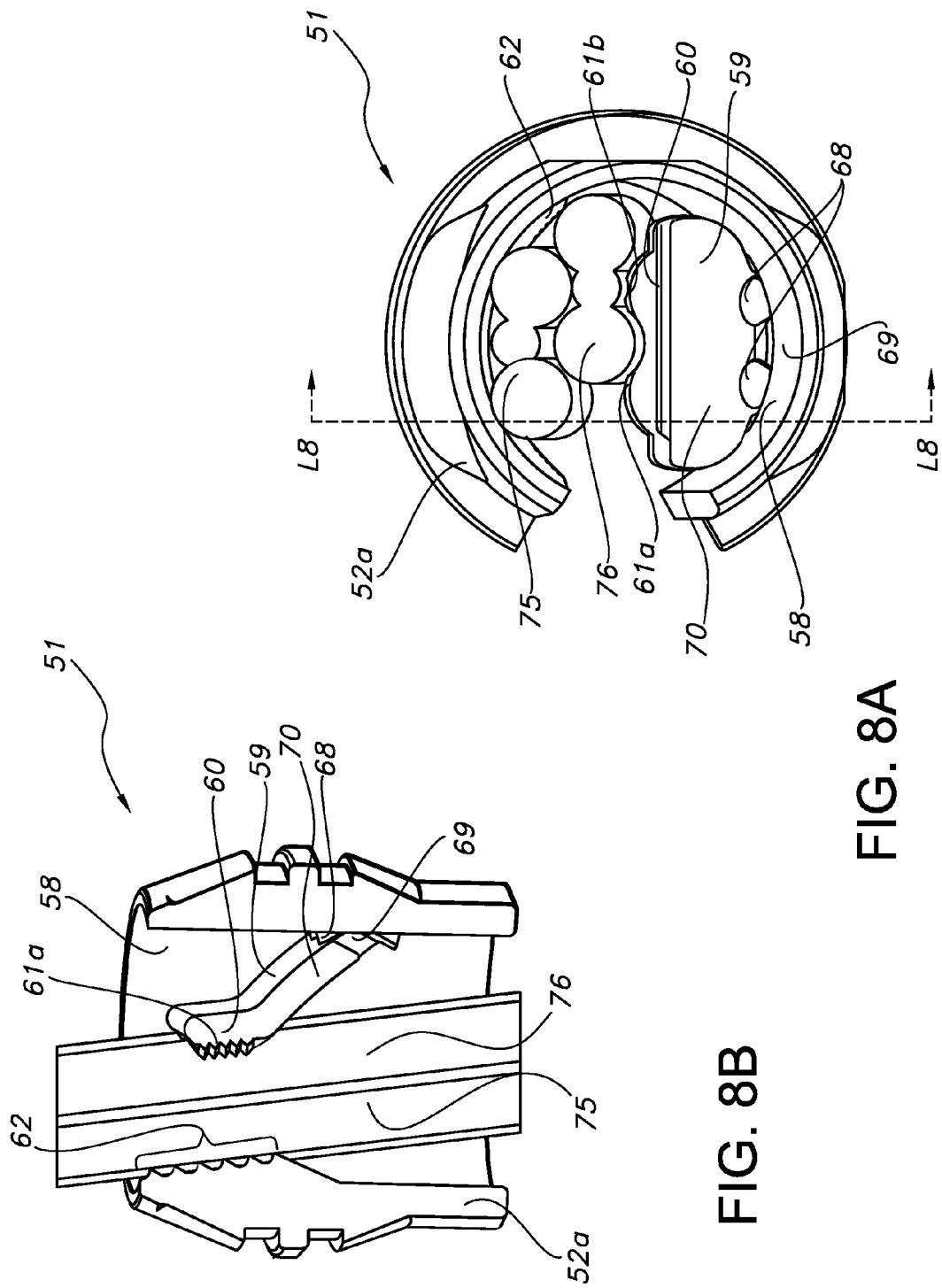
FIG. 8A is a top plan view of the wire connector of FIG. 5 from a vantage of the top of the central tab 59 and multifunction bumpers 68 with two cables 75,76 inserted in the wire connector.
FIG. 8B is a cross-section view of the wire connector as viewed along line 8-8 of FIG. 8A with two cables 75,76 inserted in the wire connector.

Also shown in FIG. 5 is a top plan view of the wire connector 51 from a vantage of the top of the central tab 59 with a multifunction tab member (here, at least one multifunction bumper 68 and preferably at least two multifunction bumpers 68). The central tab 59 has a flat and sloped proximal surface 71 on its lower or proximal surface that assists in the threading or inserting of cable through the wire connector 51 (see A-1 in FIG. 6B). The central tab 59 is connected to the interior wall 58 of the wire connector 51 at hinge 69. Hinge 69 is responsible for applying pressure on a cable inserted into the wire connector 51. When more than one cable is inserted into the wire connector 51, the hinge 69 applies pressure on a first cable, which, in turn, exerts force on a second cable. The multifunction bumpers 68 are positioned on the central tab 59 near the interior wall 58 adjacent to the hinge 69. As the name implies, the multifunction bumpers 68 perform a plurality of functions, as can be appreciated in FIGS. 6A & 6B, which show a cross-section view of the wire connector 51 as viewed along Line 6-6 of FIG. 5. First, multifunction bumpers 68 act as a stop ("stop position" 70 with an activated wire connector 51 as shown in FIGS. 8A & 8B) when the width of the cables inserted into wire connector 51 reaches or exceeds its capacity. Second, multifunction bumpers 68, when in the stop position 70, create a secondary spring function in central tab 59 including the area between the multifunction bumpers 68 and the gripping portion edge 67. The gripping portion 60 is disposed at an angle from the top surface of central tab 59 at gripping portion edge 67 toward inner ribs 62. The angle of gripping portion edge 67 allows one or more integrated tab ribs 61 to make contact with an inserted cable(s), depending on the cable(s)' diameter. For example, fewer integrated tab ribs 61 will make contact with a single inserted cable 72 having the minimum workable diameter, as illustrated in FIG. 7B, while all integrated tab ribs 61 will make contact with an inserted tab cable 76 with paired wall cable 75 together having the maximum workable diameters, as illustrated in FIG. 8B. In the former scenario, fewer integrated tab ribs 61 are needed to contact the inserted cable because the force from the hinge 69 provides sufficient holding strength when combined with the inner ribs 62. In the latter scenario, more integrated tab ribs 61 are needed to contact the inserted tab cable because it is also pinching against the wall cable without the benefit of also contacting the inner ribs 62, so the gripping portion 60 reaches the same angle as the inner ribs 62 such that all of the integrated tab ribs 61 are available to make contact with the tab cable.

This secondary spring function provides additional force for the central tab 59 to secure the cable(s) inserted into wire connector 51. This force is created by the hinge 69, which, when deformed by pushing or pulling the central tab 59 upwards (see A-2 in FIG. 6B), works to force the central tab 59 back down to its original position, therefore, applying pressure on a first or, preferably, on a first and a second inserted cable. However, this pressure alone may be insufficient to pass a pull test (discussed further in the examples, below) for a second inserted cable in known wire connectors. Therefore, the wire connector 51 includes a secondary spring area between the multifunction bumpers 68 and the gripping portion edge 67 that is designed to increase the frictional force on a second inserted cable (as seen in FIGS. 8A & 8B; the second or "wall cable" 75) positioned between the inner ribs 62 and a first inserted cable (as seen in FIGS. 8A & 8B; the first or "tab cable" 76). Without being bound by a particular theory, it is believed that a wall cable 75 is held in a wire connector, such as wire connector 51, purely by friction. The extra pressure is generated by multifunction bumpers 68 in the secondary spring area between the multifunction bumpers 68 and the gripping portion edge 67, which is strategically positioned to be "bent" when multifunction bumpers 68 is pressed against the interior wall 58 of the wire connector 51, such as when two cables are inserted into the connector (see FIGS. 8A & 8B). Thus, the multifunction bumpers 68 work to increase the force applied to inserted cable(s). The multifunction bumpers 68 are preferably conical-shaped to provide structural support at the base when the central tab is "activated" in the stop position 70 and aids in transferring force to the inserted cables. The preferred conical shape also facilitates manufacturing of the wire connector 51 by injection molding as a non-conical shape bumper 68 would be difficult to remove from the molding intact, especially during mass production. More preferably, the multifunction bumpers 68 have a flat tip to prevent "cutting" or "penetration" into the interior wall 58 when the central tab 59 is "activated" in the stop position 70. The central tab may contain a single multifunction bumper 68; however, two multifunction bumpers 68 are preferred to uniformly spread the added pressure across the central tab 59 to the inserted cable(s) when the central tab 59 is "activated" in the stop position 70. Thus, the central tab 59 then acts like a secondary spring pushing the central tab 59 back downwards and transferring extra pressure onto a wall cable 75 and a tab cable 76, if two or more cables are inserted, which then increases the friction force holding the cable(s) in the wire connector 51.

As shown in FIG. 5, wire connector 51 has an optimized (small enough to provide sufficient friction but large enough not to cut wire sheathing) gap 73 between the grip portion 60 of central tab 59 and inner ribs 62. The size of hinge 69, the optimized gap 73, and the multifunction bumpers 68 work together to improve the "pinching" force on a wall cable 75. Thus, the central tab 59 acts as a means for applying pinching force on a cable inserted into the wire connector 51. In preferred embodiments, hinge 69, the optimized gap 73, and secondary spring function of the central tab 59 with multifunction bumpers 68 are calibrated to hold more than 25 lbs. in a pull test, which is further explained in the examples below. The wire connector 51 has been found to maintain the grip on one or two inserted cables at 25 lbs. without perforating the sheathing of the cable(s). In some embodiments, hinge 69, the optimized gap 73, and secondary spring function of the central tab 59 with multifunction bumpers 68 are further calibrated to hold more than 35 lbs. in a pull test of a single inserted cable and more than 30 lbs. in a pull test of each of a first and a second inserted cable.

The inner ribs 62a-62f are designed as miniature barbs opposing a pullout force. The interior wall 58 opposite the central tab 59 gripping portion 60 is gently sloped toward the central tab 59 and interior 57 such that the rib 62f furthest from the distal edge 56 is elevated the most in relation to the interior wall 58. In some embodiments, the interior wall 58 contains no slope. In preferred embodiments, the interior wall 58 contains a minimum slope for maximizing friction force on a wall cable (all inner ribs 62 are equally in contact with a wall cable) while also aiding the de-molding process of manufacturing by injection molding. Thus, the inner ribs 62 are a means for applying a friction force on a cable inserted into the wire connectors 51. The slope necessary to maintain the integrity of structures like inner ribs 62 in de-molding is well known in the art of injection molding to be dependent on the size of such structures. The inner ribs 62 are also purposefully slanted to allow the product to de-mold without being destroyed or losing their functionality. Shown in FIG. 6A is the preferred construction of inner ribs 62 in a sloped configuration 74. The sloped configuration 74 can vary depending on the desired grip needed in the inner ribs 62 as described above. Furthermore, the inner ribs 62 are short and sharp as the design intent is to grip a wall cable 75 without piercing its outer jacket. Indeed a cable jacket is thicker than the length of the barbs of inner ribs 62. Cable jackets of wires used in conjunction with wire connectors 51 like those of the present invention have a jacket of 30 thousandths of an inch. In some embodiments, inner ribs 62 are designed to range in dimensional length of less than 30 thousandths of an inch. In preferred embodiments, inner ribs 62 have a barb dimensional length of about 8 to 25 thousandths of an inch. In further preferred embodiments, inner ribs 62 have a barb dimensional length of about 10 to 20 thousandths of an inch. In more preferred embodiments, inner ribs 62 have a barb dimensional length of about 15 thousandths of an inch. Therefore, the barbs cannot cut through the cable sheathing to expose the conductor inside. As can be appreciated in FIGS. 6A and 6C, the inner ribs 62 consist of a plurality of ribs. In preferred embodiments, the inner ribs 62 consist of between three (3) and ten (10) ribs, inclusive. In more preferred embodiments, the inner ribs 62 consist of between four (4) and eight (8) ribs, inclusive. In further preferred embodiments, the inner ribs 62 consist of six (6) ribs.

FIGS. 7A & 7B illustrate an exemplary application of an embodiment of the wire connector 51 securing a single inserted cable in an "inactive" state, meaning that the multifunction bumpers 68 are just touching or not touching the interior wall 58. FIG. 7B is a cross-section view of the wire connector as viewed along line 7-7 of FIG. 7A showing cable 72 inserted in the wire connector 51. First, the wire connector 51 is installed into an open electrical box knockout hole. Next, a single cable 72 is inserted and secured in the wire connector 51. The wire connector 51 maintains the "pinch" feature used by known wire connectors to secure a single cable 72. However, the central tab 59 has been redesigned in order to maximize the pinch force without piercing the cable sheathing. The central tab 59 geometry, hinge 69 size, and integrated tab ribs 61 are the design features that achieve this objective. The single cable 72 may also be held by a frictional force supplied by a combination of the inner ribs 62, the central tab 59, hinge 69, and the secondary spring function of the multifunction bumpers 68 if the dimension of the inserted single cable 72 is sufficient to activate the multifunction bumpers 68 (not shown in FIGS. 7A & 7B). As will be appreciated in FIG. 7B, the force of the hinge 69 on the central tab 59 will guide the inserted cable 72 against the barbs of the inner ribs 62, but not all integrated tab ribs 61 may be engaged in the pinching force, again, depending on the dimension of the inserted single cable 72. Thus, the wire connector 51 is designed to hold a single cable 72 securely. In preferred embodiments, the wire connector 51 is designed to hold a single cable with a minimum size of a 14-2 wire, as illustrated in FIGS. 7A & 7B. In other embodiments, the wire connector 51 is designed to hold a single cable of various sizes as applicable for any given use case.

FIGS. 8A & 8B illustrate another exemplary application of an embodiment of the wire connector 51 securing two inserted cables in an "activated" state. FIG. 8B is a cross-section view of the wire connector as viewed along line 8-8 of FIG. 8A showing cables 75 & 76 inserted in the wire connector 51. First, the wire connector 51 is installed into an open electrical box knockout hole. Next, a first ("tab") cable 76 is inserted and secured in the wire connector 51, such as shown in FIGS. 7A & 7B. The wire connector 51 maintains the "pinch" feature used by known wire connectors to secure a tab cable 76. However, the central tab 59 has been redesigned in order to maximize the pinch force without piercing the cable sheathing. The central tab 59 geometry, hinge 69 size, and integrated tab ribs 61 are the design features that achieve this objective. Then, a second ("wall") cable 75 is inserted and secured in the wire connector 51. As for the wall cable 75, it is not retained in place due to a pinching force, but rather due to a purely frictional force. As previously discussed, the frictional force securing wall cable 75 is supplied by a combination of the inner ribs 62, the central tab 59, hinge 69, the tab cable 76, and the secondary spring function of the multifunction bumpers 68. A person of ordinary skill in the art would readily appreciate that the first/tab cable 76 and the second/wall cable 75 can be inserted and secured in the wire connector 51 simultaneously, or one at a time as described above. As will be appreciated in FIG. 8B, the force of the hinge 69 on the central tab 59 will guide the inserted cables 75 and 76 against the barbs of the inner ribs 62, and all integrated tab ribs 61 will be engaged in the pinching force when the maximum cable load is inserted. Thus, the wire connector 51 is designed to hold two cables 75 & 76 securely. In preferred embodiments, the wire connector 51 is designed to hold two cables 75 & 76 with a maximum size of two 12-2 wire, as illustrated in FIGS. 8A & 8B. In other embodiments, the wire connector 51 is designed to hold two cables of various sizes as applicable for any given use case.

The wire connector 1,51 can be made of any resilient material and by any method known in the art. In some embodiments, the wire connector 1,51 is made of a resilient non-metallic material, such as thermoplastics or thermosets. In preferred embodiments, the wire connector 1,51 is made of any thermoplastics, for example, but not limiting, polyethylene, polyphenylene ether (PPE), acrylics, polyamides, polypropylene, etc. In more preferred embodiments, wire connector 1,51 is made of PPE. Preferably, the wire connector 1,51 is made by plastic injection molding, as known in the art. Other known methods may be used, but are not preferred.

EXAMPLE 1

Pull tests were performed on embodiments of the wire connector (1 and 51) with a single cable inserted according to industry standards as follows. First, a wire connector 1,51 is installed in an electrical box knockout hole. Next, a first end of a single cable is inserted and secured into the wire connector 1,51 from the proximal edge 5,55 side. The second ("free") end of the single cable is left free outside of the electrical box. The free end of the cable is then folded onto itself and secured by a tie-wrap to form a loop at the free end of the cable. A hanging device for holding weight plates is attached to the cable at the loop by inserting the hanging device's hook into the cable loop, and weight plates are placed on the hanging device to a desired testing weight. Current standards used by Underwriters Laboratories Inc. and CSA (Canadian Standards Association) Group require that a cable being tested hold 25 lbs. hanging weight at room temperature (approximately 20° Celsius) and in freezing conditions (at minus (−) 25° Celsius) for five (5) minutes without slipping more than 0.125(%) of an inch.

The wire connector 1 was tested as above with a single cable inserted of the following range of cable gauges: 14/2, 12/2, 10/2, 14/3, 12/3, and 10/3. The wire connector 1 with each of these gauges of cable successfully held the inserted cable secure without slipping for at least five (5) minutes at both room temperature and at minus (−) 25° Celsius with up to 37 lbs. of hanging weight without perforating the sheathing of the inserted cables. The wire connector 51 was also tested and yielded similar results. These results exceed the minimum testing requirements by 50%, and suggest that the wire connector 1,51 of the present invention can withstand even more weight under the pull test.

EXAMPLE 2

Pull tests were performed on an embodiments of the wire connector (1 and 51) with two cables inserted according to industry standards as described above in Example 1 with the following changes. A loop was created in the free ends of each inserted cable as previously described, but the hanging device was applied to each loop separately (i.e., one cable at a time while both were secured in the wire connector). The wire connector 1 was tested with the following range of cable gauges: two (2) 14/2, two (2) 12/2, one (1) 14/2+one (1) 12/2. The wire connector 1 with each of these cable combinations successfully held the inserted cables secure individually for at least five (5) minutes at both room temperature and at minus (−) 25° Celsius with up to 30 lbs. of hanging weight without perforating the sheathing of the inserted cables. The wire connector 51 was also tested and yielded similar results. These results exceed the minimum testing requirements by 20% for both cables, and suggest that the wire connector 1,51 of the present invention can withstand even more weight under the pull test.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

We claim:

1. A wire connector comprising:
a body having an exterior wall, an interior wall, a proximal edge, a distal edge, and a longitudinal slot;
said exterior wall having exterior sloped wall members extending outward from said exterior wall simulating an oval shape, and said exterior wall also having an annular exterior stop member extending outward from said exterior wall;
said interior wall having a central tab connected to said interior wall by a hinge portion; and
said central tab having a gripping portion, and said central tab also having a multifunction tab member.

2. The wire connector of claim 1, wherein said multifunction tab member is a multifunction knob.

3. The wire connector of claim 2, wherein said exterior sloped wall members are positioned on said proximal edge side and said distal edge side of said annular exterior stop member.

4. The wire connector of claim 3, wherein said multifunction knob creates a secondary spring function in said central tab when said multifunction knob is in a stop position.

5. The wire connector of claim 4, wherein said interior wall further having a plurality of inner ribs positioned on said interior wall approximately opposite of said central tab hinge position.

6. The wire connector of claim 5, wherein said multifunction knob allows for pulling said central tab away from said plurality of inner ribs for inserting or extracting one or more cables.

7. The wire connector of claim 6 further comprising an optimized space between said central tab and said plurality of inner ribs for securely holding two cables simultaneously.

8. The wire connector of claim 1, wherein said multifunction tab member is at least two multifunction bumpers.

9. The wire connector of claim 8, wherein said exterior sloped wall members are positioned on said proximal edge side and said distal edge side of said annular exterior stop member providing a first stop position between said annular exterior stop member and said exterior sloped wall members positioned on said proximal edge side and a second stop position between said annular exterior stop member and said exterior sloped wall members positioned on said distal edge side.

10. The wire connector of claim 9, wherein said at least two multifunction bumpers create a secondary spring function in said central tab when said at least two multifunction bumpers are in a stop position.

11. The wire connector of claim 10, wherein said interior wall further having a plurality of inner ribs positioned on said interior wall approximately opposite of said central tab hinge position.

12. The wire connector of claim 11, wherein said plurality of inner ribs have a dimensional barb depth of less than 30 thousandths of an inch.

13. The wire connector of claim 11 further comprising an optimized space between said central tab and said plurality of inner ribs for securely holding two cables simultaneously.

14. The wire connector of claim 8, wherein said gripping portion comprises a plurality of integrated tab ribs, said integrated tab ribs having an undulating profile facing said inner ribs.

15. The wire connector of claim 1, wherein a first cable inserted and secured in said wire connector withstands at least 37 lbs. of hanging weight in a five minute pull test at room temperature and −25° C. without slipping more than 0.125 inch.

16. The wire connector of claim 1, wherein a first and a second cable inserted and secured in said wire connector withstands at least 30 lbs. of hanging weight in a five minute pull test for both said first and said second cables at room temperature and −25° C. without slipping more than 0.125 inch.

17. A wire connector comprising:
a body having an exterior wall, an interior wall, a proximal edge, a distal edge, and a longitudinal slot;

said exterior wall having exterior sloped wall members extending outward from said exterior wall simulating an oval shape, and said exterior wall also having an annular exterior stop member extending outward from said exterior wall;

said interior wall having a central tab connected to said interior wall by a hinge portion, and said interior wall also having a plurality of inner ribs positioned on said interior wall approximately opposite of said central tab hinge portion; wherein said plurality of inner ribs are sloped inward away from said interior wall such that an inner rib distance from said interior wall increases from said distal edge side toward said proximal edge side; and said central tab having a gripping portion with a plurality of integrated tab ribs.

18. The wire connector of claim 17, wherein said exterior sloped wall members are positioned on said proximal edge side and said distal edge side of said annular exterior stop member.

19. The wire connector of claim 17, wherein said plurality of inner ribs have a dimensional barb depth of less than 30 thousandths of an inch.

20. The wire connector of claim 19, wherein said longitudinal slot and said simulated oval shape of said exterior sloped wall members accommodate tolerances for ½ inch or ¾ inch electrical box knockout holes.

21. The wire connector of claim 20, wherein said central tab further comprises a multifunction knob, wherein said multifunction knob creates a secondary spring function in said central tab when said multifunction knob is in a stop position.

22. The wire connector of claim 20, wherein said central tab further comprises at least two multifunction bumpers, wherein said at least two multifunction bumpers create a secondary spring function in said central tab when said at least two multifunction bumpers are in a stop position.

23. A wire connector comprising:
  a) an interior space for receiving one or more cables;
  b) a means for applying pinching force on said one or more cables, said pinching force means is associated with a central tab; and
  c) a first means for applying friction force on said one or more cables, said first friction force means is associated with an interior wall of said wire connector wherein said first friction force means is sloped inward away from said interior wall such that said first friction force means distance from said interior wall increases from a distal edge side toward a proximal edge side of said wire connector.

24. The wire connector of claim 23, wherein said pinching force means is a multifunction knob.

25. The wire connector of claim 23, wherein said first friction means is a plurality of inner ribs.

26. The wire connector of claim 23, wherein said pinching force means is at least two multifunction bumpers.

27. The wire connector of claim 26, further comprising:
  d) a second means for applying friction force on said one or more cables, said second friction force means is associated with a gripping portion of said central tab.

28. The wire connector of claim 27, wherein said second friction means is a plurality of integrated tab ribs.

* * * * *